(12) United States Patent
George et al.

(10) Patent No.: US 10,911,553 B2
(45) Date of Patent: Feb. 2, 2021

(54) DYNAMIC CUSTOMIZATION OF STRUCTURED INTERACTIVE CONTENT ON AN INTERACTIVE COMPUTING SYSTEM

(71) Applicant: Adobe Inc., San Jose, CA (US)

(72) Inventors: William Brandon George, Pleasant Grove, UT (US); Kevin Gary Smith, Lehi, UT (US)

(73) Assignee: ADOBE INC., San Jose, CA (US)

( * ) Notice: Subject to any disclaimer, the term of this patent is extended or adjusted under 35 U.S.C. 154(b) by 0 days.

(21) Appl. No.: 15/965,596

(22) Filed: Apr. 27, 2018

(65) Prior Publication Data
US 2019/0335006 A1    Oct. 31, 2019

(51) Int. Cl.
| | | |
|---|---|---|
| H04L 29/08 | (2006.01) | |
| G06F 3/0481 | (2013.01) | |
| G09B 7/02 | (2006.01) | |
| G09B 5/06 | (2006.01) | |
| G09B 5/08 | (2006.01) | |
| G09B 7/07 | (2006.01) | |
| G06N 3/08 | (2006.01) | |

(52) U.S. Cl.
CPC ............ *H04L 67/22* (2013.01); *G06F 3/0481* (2013.01); *G06N 3/08* (2013.01); *G09B 5/065* (2013.01); *G09B 5/08* (2013.01); *G09B 7/02* (2013.01); *G09B 7/07* (2013.01); *H04L 67/14* (2013.01)

(58) Field of Classification Search
CPC ....... H04L 67/22; H04L 67/14; G06F 3/0481; G06N 3/08; G09B 5/065; G09B 5/08; G09B 7/02; G09B 7/07
See application file for complete search history.

(56) References Cited

U.S. PATENT DOCUMENTS

| | | | | |
|---|---|---|---|---|
| 5,041,967 A * | 8/1991 | Ephrath | .................. | G06F 9/451 715/825 |
| 6,340,977 B1 * | 1/2002 | Lui | ......................... | G06F 9/453 715/709 |
| 9,185,095 B1 * | 11/2015 | Moritz | .................. | H04L 63/102 |
| 2002/0188583 A1 * | 12/2002 | Rukavina | ................. | G09B 5/00 706/45 |
| 2007/0273558 A1 * | 11/2007 | Smith | .................. | G08G 1/0962 340/995.1 |
| 2013/0198007 A1 * | 8/2013 | Selinger | ................. | G06Q 30/02 705/14.66 |
| 2013/0290339 A1 * | 10/2013 | LuVogt | ................. | G06Q 10/10 707/740 |

(Continued)

*Primary Examiner* — Mandrita Brahmachari
(74) *Attorney, Agent, or Firm* — Kilpatrick Townsend & Stockton LLP

(57) ABSTRACT

Various embodiments describe techniques for dynamically customizing structured interactive content for a particular user within a session of an interactive computing environment. Machine-learning techniques are used to establish a behavioral class of each individual user based on user interactions with a diagnostic set of interactive content items during the session. The identified behavioral class is used to customize interactive content presented later during the session using various machine-learning techniques. In some embodiments, the user progress during the session is determined based on user interactions with the customized interactive content, and a content customization is performed if the user progress is below a threshold value.

20 Claims, 8 Drawing Sheets

(56) References Cited

U.S. PATENT DOCUMENTS

| | | | |
|---|---|---|---|
| 2014/0188920 A1* | 7/2014 | Sharma | G06F 16/635 |
| | | | 707/758 |
| 2015/0278177 A1* | 10/2015 | Bisaga | G06F 40/169 |
| | | | 715/229 |
| 2016/0196399 A1* | 7/2016 | Bonhomme | G16H 50/20 |
| | | | 705/3 |
| 2016/0314784 A1* | 10/2016 | Kleppe | G10L 25/51 |
| 2017/0053208 A1* | 2/2017 | Krishnamurthy | G06N 5/022 |
| 2017/0316487 A1* | 11/2017 | Mazed | G06Q 30/0241 |
| 2019/0147760 A1* | 5/2019 | Bruckner | G10L 15/22 |
| | | | 706/11 |
| 2019/0189020 A1* | 6/2019 | Punia | G06N 20/20 |

* cited by examiner

DYNAMIC CUSTOMIZATION OF STRUCTURED INTERACTIVE CONTENT ON AN INTERACTIVE COMPUTING SYSTEM

TECHNICAL FIELD

This disclosure relates generally to machine-learning systems that facilitate dynamic customization of interactive content presented by computing systems. More specifically, but not by way of limitation, this disclosure relates to applying machine-learning techniques to determine user characteristics and the progress of a user device through a session of a structured interactive computing environment and dynamically selecting content for presentation at the user device during the session.

BACKGROUND

Interactive computing environments, such as web-based applications or other online software platforms, allow users to perform various computer-implemented functions through graphical interfaces. A given interactive computing environment includes different graphical interfaces, each of which has a particular arrangement of available functionality or other content, that correspond to different stages within the interactive computing environment. An example of an interactive computing environment is a structured interactive computing environment, where the similar or same sequence of interactive content is presented to different users of an interactive content system (e.g., an e-learning system). These structured interactive computing environments can be enhanced by, for example, modifying a user's experience (e.g., a learning experience) based on simple metrics, such as presenting certain features at different levels of difficulty based on a rate of progress through the sequence of interactive content.

However, customization techniques present limitations with respect to structured interactive computing environments. For instance, current techniques are often limited to simple metrics (e.g., progress rate or error rate) that fail to account for user status and characteristics such as user capabilities, needs, personality, preferences, engagement level, current progress, etc. Therefore, the interactive computing systems cannot tailor the interactive content during a session to users with a suitable level of particularity, such as customizing interactive educational content in a manner that enhances user interaction and comprehension.

SUMMARY

Embodiments of the present disclosure involve presenting interactive content dynamically tailored for each individual user during a session with an interactive computing environment to enhance user experience. According to certain embodiments, a method of dynamically customizing structured interactive computing environments includes monitoring user interactions with diagnostic interactive content presented during a session with a structured interactive computing environment, and determining a user behavioral class by applying a machine-learning model to the monitored user interactions with the diagnostic interactive content. The user behavioral class indicates learning characteristics of a user. Based on the determined user behavioral class, subsequent interactive content to be presented is customized In some embodiments, customizing the subsequent interactive content includes, for example, identifying a particular stage of the structured interactive computing environment within the session, selecting a first interactive content item corresponding to the determined user behavior class from a set of interactive content items associated with the particular stage, and configuring the structured interactive computing environment to present the first interactive content item within the particular stage of the session. In some embodiments, customizing the subsequent interactive content includes selecting a first interactive content item and determining a manner (e.g., an order, a time, a color, or a volume) corresponding to the determined user behavioral class to present the first interactive content item.

In some embodiments, the method also includes monitoring user interactions with customized interactive content presented during the session, determining a user progress value based on the monitored user interactions with the customized interactive content, determining that the user progress value is below a threshold value, and triggering the customizing of the subsequent interactive content. The user progress value indicates a performance of the user during the user interactions with the customized interactive content.

These illustrative examples are mentioned not to limit or define the disclosure, but to provide examples to aid understanding thereof. Additional embodiments and examples are discussed in the Detailed Description, and further description is provided there.

BRIEF DESCRIPTION OF THE FIGURES

Features, embodiments, and advantages of the present disclosure are better understood when the following Detailed Description is read with reference to the accompanying drawings.

DETAILED DESCRIPTION

Figure 1:
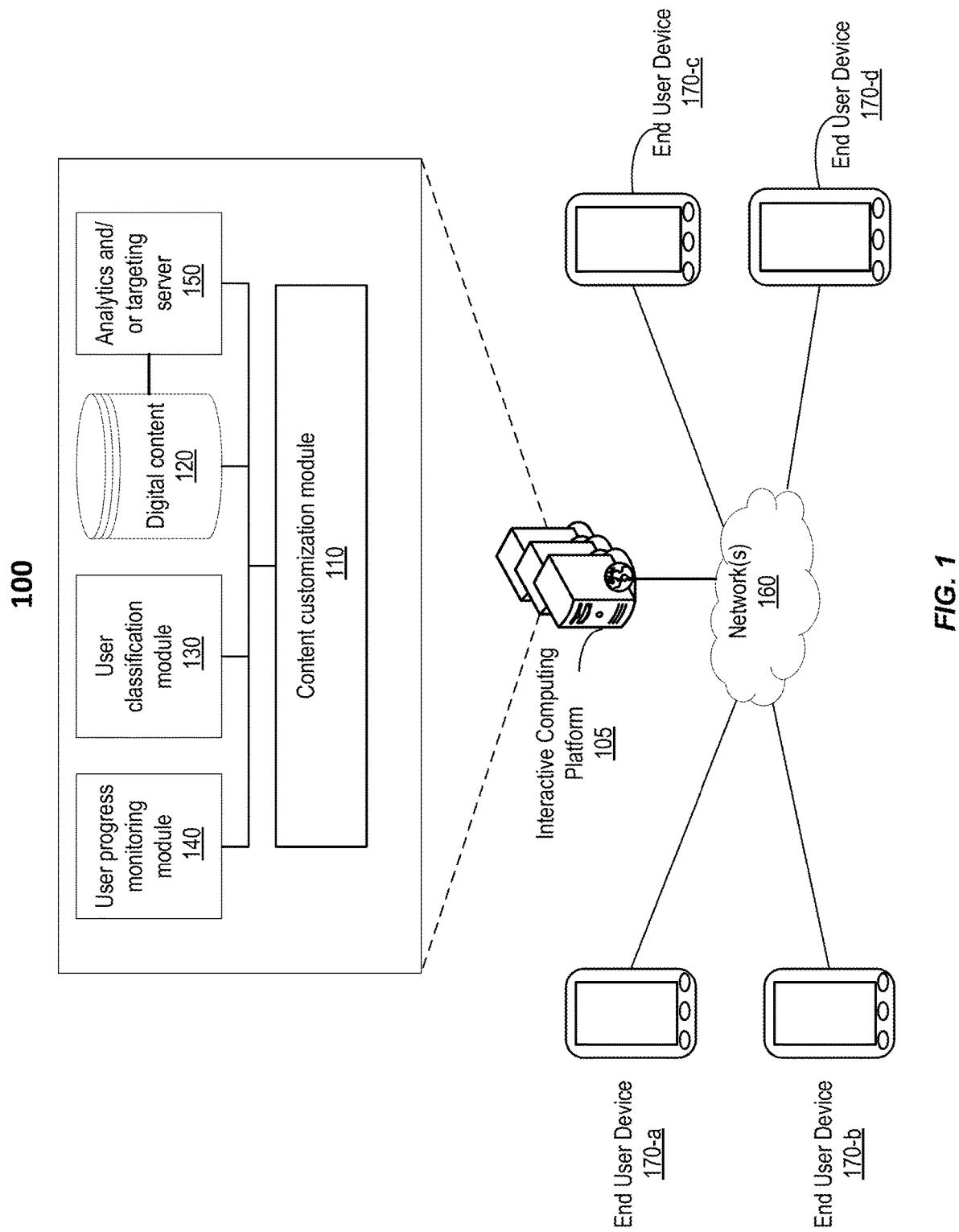
FIG. 1 illustrates an example of an interactive computing environment that hosts and customizes a structured interactive computing environment according to certain embodiments.

Techniques disclosed herein relate generally to dynamically customizing structured interactive content to a particular user within a particular session of an interactive computing environment. In certain embodiments, various machine-learning techniques are used to establish a behavioral class of each individual user based on user interactions with a first set (e.g., a diagnostic set) of interactive content items during the session. The machine-learning techniques can associate certain types of baseline interactions with certain behavior classes representing a particular set of user characteristics (e.g., preferences, personality, learning style, etc.). The identified behavioral class is used to customize, during the session, content items presented later in a sequence of structure interactive content.

The following non-limiting example is used to introduce certain embodiments. In this example, a content customization module customizes a structured interactive computing environment having a defined sequence of stages, where interactions with content in a given stage is required for advancing the structured interactive content to a second stage (e.g., different stages of an e-learning environment). In a session within the structured interactive computing environment, diagnostic interactive content items are presented at a user device during an initial stage of the structured interactive computing environment. The diagnostic interactive content items, which can be the same for all users (e.g., a set of test questions), are used to automatically classify an individual associated with the user device. The content customization module monitors user interactions with these items and thereby classifies, in early stages of the session, a given user by applying a user classification model to the interactions with the diagnostic interactive content items. For instance, the user classification model could be a machine-learning model trained to classify an input vector of user interactions as a particular behavioral class (e.g., a learning style).

Continuing with this example, in a subsequent stage of the structured interactive computing environment, the content customization module selects, from a second set of interactive content items, a subsequent interactive content item corresponding to the determined behavioral class of the user. The selected interactive content item corresponds to the behavioral class of the user because, for example, the selected interactive content item is more likely to facilitate subsequent engagement with and progress through the structured interactive computing environment (e.g., an e-learning module) as compared to one or more other interactive content items in the second set.

Because the content displayed at user devices and the manner of displaying the content are tailored for a particular user device based on the behavioral class and the current stage of the particular session, customized content can be presented to individual user devices in an optimized manner. In addition, techniques disclosed herein monitor the progress of the user and the engagement level of the user during the session, and present content that can increase the engagement level and accelerate the progress of the user. Furthermore, the user experience of other users in the same behavior class and having progress similar to the user at various stages of the session is also used to determine the next content item to be displayed to a user, appropriate content can be presented to the user more quickly without going through several rounds of trial-and-error processes. Therefore, compared with existing interactive content systems, the interactive content system disclosed herein can greatly enhance the user experience, such as help the user to comprehend the interactive content at a much faster rate.

As used herein, the term "structured interactive computing environment" refers to an interactive computing environment where interactive content is presented to different users in a defined sequence that is partially controlled by user inputs. A structured interactive computing environment includes, for example, an e-learning environment. In some embodiments, structured interactive computing environment includes a sequence with a specified number of modules or stages, where the sequence includes a defined start point for initiating the sequence and a defined end point at which a session of the structured interactive computing environment terminates after reaching the end of the sequence.

As used herein, the term "content customization" is used to refer to, for example, selecting different content items for different users, presenting same content items in different orders to different users, presenting same content items in different ways to different users (e.g., display same content in different foreground colors, background colors, or font sizes, or play the same music at different volumes), creating customized content items by combining or modifying existing content items, or any combination thereof.

As used herein, the term "user behavior class" is used to refer to a group of characteristics, behavioral traits, or some combination thereof for a user of a user device that accesses a structured interactive computing environment. The characteristics include, for example, preferences, personality, learning style, hobbies, interests, or capabilities of the user. A user can be associated with one or more user behavior classes. For example, one user behavior class may indicate whether the user is a visual learner, and another user behavior class may indicate whether the user is a sports fan.

As used herein, the term "neural network" refers to one or more computer-implemented, network-based models capable of being trained to achieve a goal. Unless otherwise indicated, references herein to a neural network include one neural network or multiple interrelated neural networks that are trained together. Examples of neural networks include, without limitation, convolutional neural networks (CNNs), recurrent neural networks (RNNs), fully-connected neural networks, dense-connection neural networks, feed-forward neural networks, and other types of neural networks. In some embodiments, a neural network can be implemented using special hardware (e.g., GPU, tensor processing units (TPUs), or processing element arrays (PE arrays)), using software code and a general purpose processor, or a combination of special hardware and software code.

The following examples are provided to introduce certain embodiments. In the following description, for the purposes of explanation, specific details are set forth in order to provide a thorough understanding of examples of the disclosure. However, it will be apparent that various examples may be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples. The figures and description are not intended to be restrictive. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as an "example" is not necessarily to be construed as preferred or advantageous over other embodiments or designs.

FIG. 1 illustrates an example of an interactive computing environment 100 that hosts and customizes a structured interactive computing environment according to certain embodiments. As illustrated, interactive computing environment 100 includes an interactive computing platform 105 and multiple end user devices 170-*a*, 170-*b*, 170-*c*, 170-*d*, etc. (collectively referred to as 170). End user devices 170 are connected to interactive computing platform 105 through one or more network(s) 160.

In some embodiments, interactive computing platform 105 includes a content customization module 110 and a digital content repository 120. Digital content repository 120 includes video, audio, image, text data or files, or data or files for other digital content. In some embodiments, the digital content includes interactive content for which user responses are generally expected. The interactive content includes, for example, questions to the users, an interactive applet that the users can manipulate, or menus or lists that the users can use to select the subsequent content. In some embodiments, the digital content includes content for which no user response is expected. For example, the content can include a video or audio clip, a song, a recorded educational session, a joke, a short story, a cartoon, etc. In one specific example, digital content in digital content repository 120 includes educational materials, such as lectures, quizzes, demos, labs, games, slides, pictures, animations, etc.

Content customization module 110 manages the selections of digital content items for each user from digital content repository 120 based on certain rules or models, and the delivering or presentation of the selected digital content items to the user. In some embodiments, the combination of the selected digital content items is customized for each user. In some embodiments, the permutation of the selected digital content items (e.g., the order in which the selected digital content items are presented) is customized for each user. In many cases, both the combination of the selected digital content items and the permutation of the selected digital content items are customized for each user. In some cases, content customization module 110 can dynamically create content customized for a user based on some digital content items in digital content repository 120. More detail of the operations and functions of content customization module 110 is described below.

In some embodiments, interactive computing platform 105 also includes a user classification module 130. User classification module 130 determines user behavior class or user characteristics (e.g., preferences, personality, learning style, hobby, etc.) using some machine learning techniques based on user interactions with some diagnostic content items. In some embodiments, user classification module 130 classifies a user into one or more user behavior classes based on a set of user characteristics, for example, using machine learning-based classifiers, such as a Support Vector Machines (SVM) or k-Nearest Neighbor (KNN) classifier. More detail of the operations and functions of user classification module 130 is described below.

In some embodiments, interactive computing platform 105 also includes a user progress monitoring module 140. User progress monitoring module 140 monitors the progress of a user with an interactive session and determines, for example, a current stage of the session, based on user responses. In some embodiments, the current stage of the session is determined by content customization module 110 that manages the delivering of the customized content to different users. The progress of the user includes, for example, the speed of user responses, the accuracy of the user responses, the engagement level of the user, etc. In some embodiments, user progress monitoring module 140 determines the effectiveness of the customized content presented to the user on user performance, and the determined effectiveness can be used to, for example, fine tune the determined user characteristics or classes or fine tune the models or functions used to customize digital content items for individual users. In some embodiments, user progress monitoring module 140 determines the progress of the user with a session using machine learning-based models or rules. More detail of the operations and functions of user progress monitoring module 140 is described below.

In some embodiments, interactive computing platform 105 also includes an analytics and targeting server 150. Analytics and targeting server 150 determines subsequent content items to present to a user using selection rules, functions, or models, in response to a query from content customization module 110. In some embodiments, the selection model includes a neural network generated using, for example, machine learning techniques. The query includes information, such as the user characteristics or user behavior classes determined by user classification module 130, the user progress determined by user progress monitoring module 140, and the current stage of the session determined by user progress monitoring module 140 or content customization module 110. In some embodiments, analytics and targeting server 150 compares the user's progress at a particular stage of a session with the progress of other users having user characteristics similar to the particular user at the corresponding stage. Thus, the selected content item to be presented to the particular user can be an item that can improve user experience the most. The selected content items or the locations of the selected content items can be provided to content customization module 110 for presenting the selected content items to the user. More detail of the operations and functions of analytics and targeting server 150 is described below.

As described above, various machine learning techniques can be used to generate rules, trainable models, or neural networks used in different modules, such as user classification module 130, user progress monitoring module 140, and analytics and targeting server 150. In some embodiments, the rules, trainable models, or neural networks are pretrained. In some embodiments, the rules, trainable models, or neural networks can be adjusted in real time based on, for example, the monitored effectiveness of the customized content.

In various embodiments, one interactive computing platform 105 serves a large number of users and customizes content for each user. In some embodiments, a user starts an interactive session using an application software or a web browser on end user device 170. At early stages of the session, content customization module 110 of interactive computing platform 105 can present some diagnostic interactive content to end user device 170. The user can respond to the diagnostic interactive content through an user interface of end user device 170. Based on user interactions with the diagnostic interactive content, user classification module 130 can determine user characteristics and/or classify the user into one or more user behavior classes. In some embodiments, the user characteristics or user behavior classes of a registered user are stored at, for example, a user database (not shown in FIG. 1) or analytics and targeting server 150. Content customization module 110 then queries analytics and targeting server 150 for subsequent content items to be delivered to end user device 170. Analytics and targeting server 150 selects the subsequent content items from digital content repository 120 and determines the appropriate ways to present the subsequent content items. Content customization module 110 then delivers the customized content items in the appropriate manner to the user. User progress monitoring module 140 monitors user interactions with the customized content items, and determines the progress of the user, such as the response speed, accuracy of the responses, engagement level, etc. In some embodiments, user progress monitoring module 140 also determines the effectiveness of the customized content. During the session, content customization module 110 continuously queries analytics and targeting server 150, which would determine the subsequent customized content based on the user progress, user characteristics, the current stage of the session, and/or the effectiveness of customized content presented to the user previously.

Figure 2:
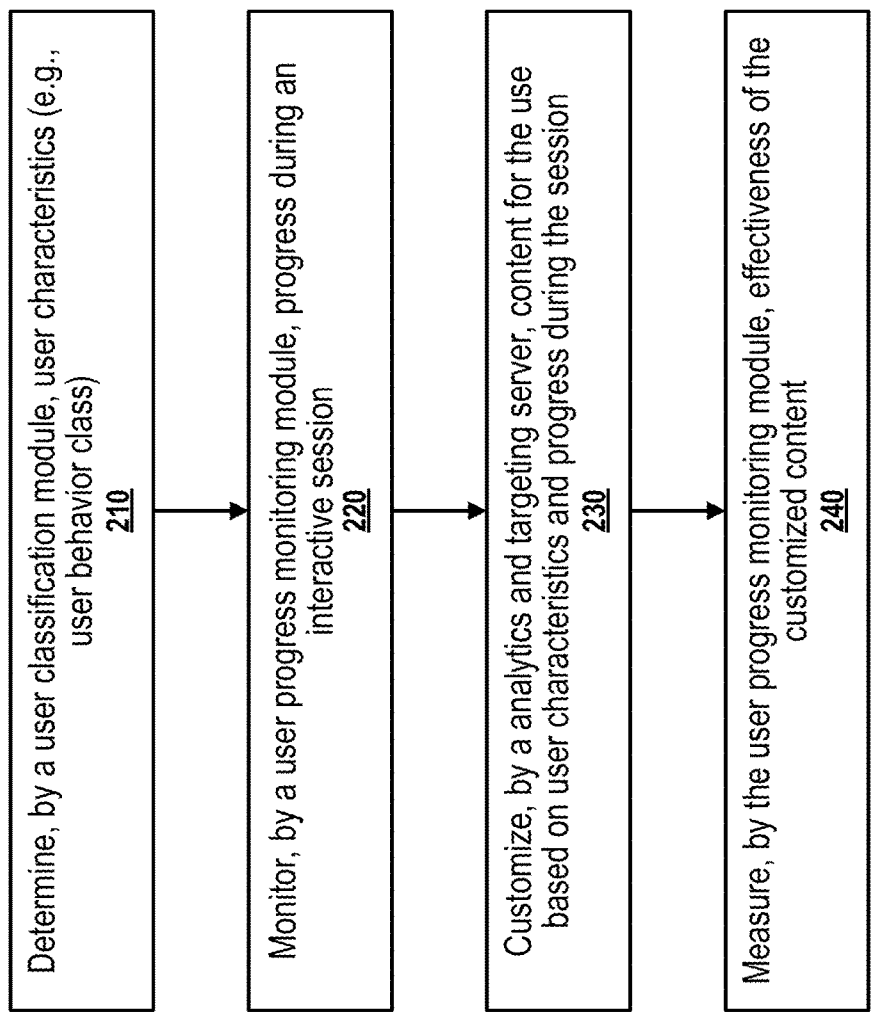
FIG. 2 illustrates an example of a method of dynamically customizing structured interactive content in an interactive computing system according to certain embodiments.

FIG. 2 is a flow chart 200 illustrating an example of a method of dynamically customizing structured interactive content in an interactive computing system, such as interactive computing environment 100, according to certain embodiments. Operations described in flow chart 200 can be performed by various modules of the structured interactive computing environment, such as the modules in interactive computing platform 105.

At block 210, user classification module 130 or other suitable module determines user characteristics, the user behavior class, or both. In some embodiments, the module determines the user characteristics in a separate session (e.g., a previous session) and stores them with a record of a user database, where the record corresponds to a registered user. In some embodiments, the module determines the user characteristics in the current session in real time. In some embodiments, the module determines the user characteristics based on user interactions with interactive content presented to the user, for example, at some early stages of an interactive session. The interactive content used for determining some user characteristics (referred to as diagnostic content) can be same for all users. As the session progresses, interactive content used for determining or confirming some other user characteristics can be customized. The user characteristics can be indirectly inferred from user responses or can be directly provided by the user in response to specific questions. For example, the interactive content can include questions regarding the favorite sports (or sports team), favorite music, favorite color, hobbies, etc., in multiple-choice questions or open-ended questions.

Some user characteristics are indirectly inferred from user responses. For example, if the user answers questions with visual diagrams quicker than other questions, the module can infer that the user may be a visual learner. If the user spends more time on content associated with sports, or if the user's performance (e.g., response speed and accuracy) goes up when sports jokes or videos are inserted between questions or when sports statistics are used in mathematical questions, the module can infer that the user may be a sports fan. Some user characteristics could be determined using, for example, machine learning-based models or classifiers, such as a classifier implemented using a neural network (e.g., a fully-connected network or a convolutional neural network). In this way, a set of user characteristics can be determined for a user. For example, in an e-learning system, the system might learn that a user is a visual learner, learns materials better with several repetitions, needs more examples and frequent breaks, and likes sports, and the user's performance drops significantly when he/she gets frustrated. In some embodiments, the system can class the user into one or more behavior classes based on one or more user characteristics or user interactions with the interactive content.

At block 220, user progress monitoring module 140 or other suitable module monitors user progress during the session. The user progress includes, for example, the current stage of the session, the progress rate of the user during the session (e.g., time required to finish different stages of the session), and the response speed and the accuracy of the user's responses at different times. In some embodiments, from the monitored progress, user progress monitoring module 140 can determine certain statuses of the user. For example, if the user performance (e.g., speed or accuracy) drops at a later stage, user progress monitoring module 140 may determine that the user is tired and may need a break. If the user provides no response to a question for a long period of time but is still using the end user device, user progress monitoring module 140 may determine that the user is not paying attention to the content (e.g., is engaging in some other activities) or is stuck at the question (and thus some additional materials may help the user to answer the question). As the operations in block 210, user progress monitoring module 140 can determine some user progress using machine learning-based models or classifiers implemented in, for example, a neural network.

At block 230, content customization module 110, analytics and targeting server 150, or other suitable module customizes interactive content for the user based on the user characteristics determined at block 210 and the user progress determined at block 220. The suitable module can customize interactive content by selecting appropriate content items from a content database, such as digital content repository 120, and determining the best way to present to the user. For example, as described above, if the user is determined to be a sports fan and the user has slowed down or is not paying full attention, sports related videos, such as highlights of some games (e.g., dunks, touchdowns, goals, eagles, record-breaking events, etc.), can be presented to the user at a higher volume or in a larger window size. In some embodiments, past performance of the user or the performance of other users with similar user characteristics or in the same behavior class as the user is also used to customize the content. In some embodiments, a large number of inputs or parameters are used to customize the content for a particular user, and thus a neural network with many input nodes is used for the content customization. Content customization module 110 of interactive computing platform 105 then delivers the customized content to the end user device used by the user.

At block 240, user progress monitoring module 140 or other suitable module can measure the effectiveness of the customized content on subsequent user performance based on, for example, user progress (e.g., user performance) monitored by user progress monitoring module 140 as described above at block 220, after the customized content is presented to the user. If the user performance is improved after the customized content is presented to the user, the customized content is effective. Otherwise, user progress monitoring module 140 may determine that, for example, the customized content is not effective and different customized content may need to be determined, or the model or network used for content customization may need to be improved. In this way, more effective customized content can be presented to the user, or to other users in future sessions.

More detailed implementations of the operations in flow chart 200 according to some embodiments are described below.

As described above, to enhance user experience with an interaction session, such as user comprehension of educational content in an e-learning session, relevant user characteristics or user behavior classes are used to determine customized content for each individual user, according to certain embodiments. For different structured interactive content sessions, the user characteristics used can be different. For e-learning sessions, user characteristics or behavior classes used for content customization include, for example, permanent or static characteristics of a user, and temporary or dynamic characteristics of the user.

Permanent or static characteristics of the user include the learning style of the user, such as whether the user is an audio learner or a visual learner, whether the user prefers step-by-step proofs, whether the user learns more efficiently through theoretical concepts or through practical examples, whether the user performs well on multiple choice questions or on open-ended questions, whether the user likes to learn broader or deeper content/knowledge, etc. Permanent or static characteristics of the user can also include user personality, such as easy going vs serious, laid back vs get things done, what could motivate the user, etc. Permanent or static characteristics of the user can also include user preferences or interests, such as the preferred types of music (e.g., hard rock or classical) or the preferred singer, the preferred sports or sports team, preferred color, screen brightness, or audio volume, favorite activities or hobbies (e.g., travel, biking, or movies), the type of pet owned, etc. These permanent or static characteristics can be determined in one session and used in later sessions. Temporary or dynamic characteristics of the user can include, for example, current mood of the user, or how urgent the user needs to learn some materials (e.g., to prepare for an upcoming exam).

In some embodiments, specially designed diagnostic interactive content is used to facilitate the user behavior classification or the determination of some characteristics of the user. The diagnostic interactive content can be the same for all users for a specific session or can be the same for all interactive sessions. The diagnostic interactive content can include explicit questions asking certain characteristics of the user or can include questions the answers to which can be used to infer the user characteristics. Some user characteristics (e.g., temporary characteristics described above) of the user are determined as an interactive session progresses. Various artificial intelligence or machine learning techniques can be used to determine the user characteristics or to classify the user behavior. For example, SVM or KNN classifiers can be used to determine certain characteristics or behavior classes of the user based on binary classification or multi-class classification, and user interactions with the diagnostic content.

In some embodiments, interactive content items (e.g., questions) are tagged or labeled to indicate the possible user characteristics that can be determined based on user interactions with the interactive content items. In one example, the tag or label can include a weight of the item associated with each respective characteristic of the user. The weights can be different for different answers to a same question. For example, if a multiple-choice question has four choices, each choice can have a respective weight. As the user responds to the interactive content items, the user responses can be fed to, for example, user classification module 130, where possible characteristics and the associated weights for different questions are aggregated to determine the user characteristics. A user profile can then be formed based on all possible characteristics.

In one example, a feed-forward neural network is used to determine a set of characteristics of the user based on user responses to a set of questions. The basic unit of computation in a neural network is the neuron (also referred to as a node). A neuron receives input from some other neurons or an external source and computes an output. Each input may have an associated weight (w), which may be assigned based on the importance of the input relative to other inputs. The neuron may also apply a function (e.g., a nonlinear function) to the weighted sum of its inputs. A feedforward neural network is a type of artificial neural network that includes multiple nodes arranged in layers. Nodes from adjacent layers have connections or edges between them. These connections have corresponding weights associated with them. Information flows from the input nodes, through the hidden nodes (if any) and to the output nodes. There are no circles or loops in the network. In contrast, recurrent Neural Networks (e.g., a long short-term memory (LSTM) network) includes connections between the nodes to form a circle or loop.

Figure 3:
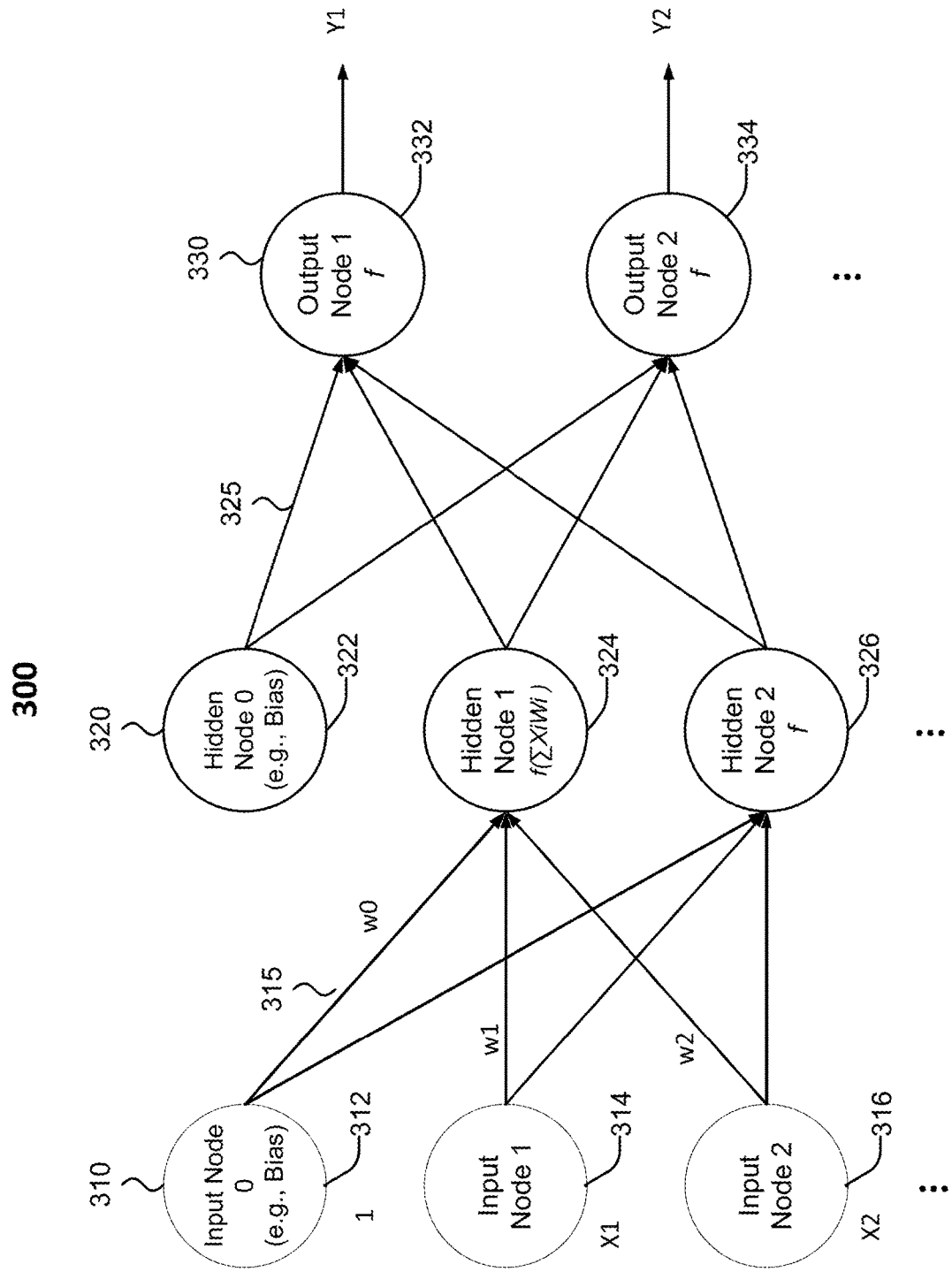
FIG. 3 illustrates an example of a multi-layer neural network that can be used for user behavior classification according to certain embodiments.

FIG. 3 illustrates an example of a multi-layer neural network 300 that can be used for user behavior classification according to certain embodiments. Multi-layer neural network 300 includes an input layer 310, a hidden (or intermediate) layer 320, and an output layer 330. In many implementations, multi-layer neural network 300 includes two or more hidden layers and can be referred to as a deep neural network. A neural network with a single hidden layer is generally sufficient to model any continuous function. However, such a network may need an exponentially larger number of nodes when compared to a neural network with multiple hidden layers. It has been shown that a deeper neural network can be trained to perform much better than a comparatively shallow network.

Input layer 310 includes a plurality of input nodes (e.g., nodes 312, 314, and 316) that provide information (i.e., input data) from the outside world to the network. In one embodiment, each input node corresponds to a question presented to the user. The input nodes pass on the information to the next layer, and no computation is performed by the input nodes. Hidden layer 320 includes a plurality of nodes, such as nodes 322, 324, and 326. In one embodiment, each node on hidden layer 320 corresponds to an intermediate feature that can be used to determine the characteristics of the user. The nodes in the hidden layer have no direct connection with the outside world (hence the name "hidden"). They perform computations and transfer information from the input nodes to the next layers (e.g., another hidden layer or output layer 330). While a feedforward neural network may have a single input layer and a single output layer, it may have zero or multiple hidden layers. Output layer 330 includes a plurality of output nodes that are responsible for computing and transferring information from the network to the outside world, such as classifying certain objects or activities, or determining a condition or an action. In one embodiment, each output node corresponds to a characteristic of the user.

In the feedforward neural network shown in FIG. 3, a node (except the bias node if any) can have connections to all nodes (except the bias node if any) in the immediately preceding layer and the immediate next layer. Thus, the layers may be referred to as fully-connected layers. All connections between nodes have weights associated with them, even though only some of these weights are shown in FIG. 3. For a complex network, there may be hundreds or thousands of nodes and thousands or millions of connections between the nodes.

As described above, a feedforward neural network may include zero (referred to as a single layer perceptron) or one or more hidden layers (referred to as a multi-layer perceptron (MLP)). Even though FIG. 3 only shows a single hidden layer in the multi-layer perceptron, a multi-layer perceptron may include one or more hidden layers (in addition to one input layer and one output layer). A feedforward neural network with many hidden layers is referred to as a deep neural network. While a single layer perceptron may only learn linear functions, a multi-layer perceptron can learn non-linear functions.

In the example shown in FIG. 3, node 312 can be a bias node having a value of 1 or can be a regular input node. Nodes 314 and 316 take external inputs X1 and X2, which can each be a user response to the corresponding question. As discussed above, no computation is performed on input layer 310, and thus the outputs from nodes 312, 314, and 316 on input layer 310 are 3, X1, and X2, respectively, which are fed into hidden layer 320.

In the example shown in FIG. 3, node 322 can be a bias node having a value of 1 or can be a regular network node. The outputs of nodes 324 and 326 in hidden layer 320 depend on the outputs from input layer 310 (i.e., 1, X1, X2, etc.) and weights associated with connections 315. For example, node 324 can take numerical inputs X1 and X2 and weights w1 and w2 associated with those inputs. As described above, weights associated with connections 315 can be weights associated with each of the possible characteristics of the user, or weights associated with each of a set of possible intermediate features of the user that can be used to determine the user characteristics. Additionally, node 324 has another input (referred to as a bias), such as 1, with a weight w0 associated with it. The main function of the bias is to provide every node with a trainable constant value (in addition to the normal inputs that the node receives). The bias value allows one to shift the activation function to the left or right. It is noted that even though only three inputs to node 324 are shown in FIG. 3, in various implementations, a node may include tens, hundreds, thousands, or more inputs and associated weights.

The output Y from node 324 can be computed by:

$$Y = f(w1 \times X1 + w2 \times X2 + w0), \quad (1)$$

where function $f$ can be a non-linear function that is often referred to as an activation function. When a node has K inputs, the output from the node can be computed by:

$$Y = f(\Sigma_{i=0}^{K-1} w_i X_i). \quad (2)$$

Thus, the computation on each neural network layer can be described as a multiplication of an input matrix and a weight matrix and an activation function applied on the products of the matrix multiplication. The outputs from the nodes on an intermediate layer can then be fed to nodes on the next layer, such as output layer 330.

The purpose of the activation function is to introduce non-linearity into the output of a neural network node because most real world functions are non-linear and it is desirable that the neurons can learn these non-linear representations. The activation function may take a single number and perform a certain fixed mathematical operation on it. Several activation functions may be used in an artificial neural network, including the sigmoid function $\sigma(x)$, which takes a real-valued input and transforms it into a value between 0 and 1; the tan h function, which takes a real-valued input and transforms it into a value within the range of [−1, 1]; the rectified linear unit (ReLU) function $f(x) = \max(0, x)$, which takes a real-valued input and thresholds it above zero (i.e., replacing negative values with zero); and the leaky ReLU function, which may be defined as Leaky-ReLU(x)=max(0, x)+α min(0, x), where α may be a predetermined parameter or a parameter that can be learned.

Output layer 330 in the example shown in FIG. 3 can include multiple nodes, such as nodes 332 and 334, which take inputs from hidden layer 320 and perform similar computations as the hidden nodes using weights associated with connections 325. The calculation results (Y1 and Y2) are the outputs of the multi-layer perceptron. As described above, each node on output layer can correspond to a user characteristic or a user behavior class. Thus, the output at an output node is a weighted sum of the user's response to each question represented by an input node. In some embodiments, a threshold is used at each output node to determine whether a user has the correspond characteristic. For example, one output node can correspond to "visual learner." If the output of the output node is greater than, for example, 0.6, it can be determined that the user is likely a visual user. If the output of the output node is greater than, for example, 0.9, it can be determined that the user is primarily a visual user or there is a very high probability that the user is a visual learner. In some embodiments, in an MLP for classification, a Softmax function can be used as the activation function in the output layer. The Softmax function takes a vector of real-valued scores and maps it to a vector of values between zero and one that sum to one.

For a given set of input features X=(x1, x2, . . . ) and a target Y, a multi-layer perceptron can learn the relationship between the user responses to questions and the characteristics of the user. A multi-layer perceptron can learn using, for example, a backpropagation algorithm. Backward propagation of errors (often referred to as BackProp) is one of several ways in which an artificial neural network can be trained. BackProp can be a supervised training scheme that learns from labeled training data and errors at the nodes by changing parameters of the neural network to reduce the errors.

As described above, the connections between nodes of adjacent layers in an artificial neural network have weights associated with them, where the weights determine what the output is for a given input. The learning or training process can assign appropriate weights for these connections. In some embodiments, the initial values of the weights is randomly assigned. For every input in a training dataset, the output of the artificial neural network is observed and compared with the expected output, and the error between the expected output and the observed output is propagated back to the previous layer. The weights can be adjusted accordingly based on the error. This process is repeated until the output error is below a predetermined threshold.

The backward propagation of errors can be based on the chain-rule used for nested functions y=f(g(x)) to determine a gradient:

$$\frac{\partial y}{\partial x} = \frac{\partial f}{\partial x} = \frac{\partial f}{\partial g}\frac{\partial g}{\partial x}, \quad (3)$$

where $g(x) = \sum_{i=0}^{n} x_i w_i$, $\frac{\partial f}{\partial g}$ is the derivative of the activation function, and $$\frac{\partial g}{\partial x}$$

may be proportional to weight w. The errors at the output nodes are calculated and propagated back through the network to calculate the gradients. An optimization method, such as Gradient Descent, can be used to adjust the weights in the network to reduce the errors at the output layer.

Backpropagation is computationally cheaper than forward propagation as forward propagation involves successively multiplying large matrices on each layer until multiplying a large matrix by a vector on the output layer. The backpropagation starts with multiplying a matrix by a first vector to get a second vector, multiplying another matrix by the second vector to get a third vector, and so forth. In other words, the backpropagation uses more efficient matrix-vector multiplications instead of matrix-matrix multiplications.

After the weight adjustment, the network should perform better than before the weight adjustment for the same input because the weight adjustment will minimize or otherwise reduce the errors. This process may be repeated for multiple training samples in the training dataset to learn from these samples. The final weights of the network thus include the learned weights of each question associated with different user characteristics, and can be used to determine characteristics of a new user based on the new user's responses to the set of questions.

In some embodiments, the manners that the user responds to the questions are also used as inputs to the neural network. For example, user response time for each question or some user actions, such as turning down the volume of an audio device (e.g., a speaker) or adjusting the window or font size, are also represented by an input node and are used as inputs to the neural network for user behavior classification.

In many situations, using the feedforward neural network as described above may not be practical when the number of questions or the number of user characteristics or user behavior classes is large. Thus, the number of weights and hence the total memory used for the weights can be very large. In some embodiments, a convolutional neural network that performs convolutions using smaller convolutional filters rather than the large matrix multiplications as described above is used for user behavior classification. Learning a set of convolutional filters may be much easier and faster than learning a large matrix. Convolutional neural networks may be described as feedforward neural networks with local connectivity and weight sharing. The local connectivity refers to the fact that a convolutional filter may have much smaller dimensions than total input nodes (e.g., questions). The weight sharing is due to the fact that a same filter may be used across the input nodes when performing the convolution.

Figure 4:
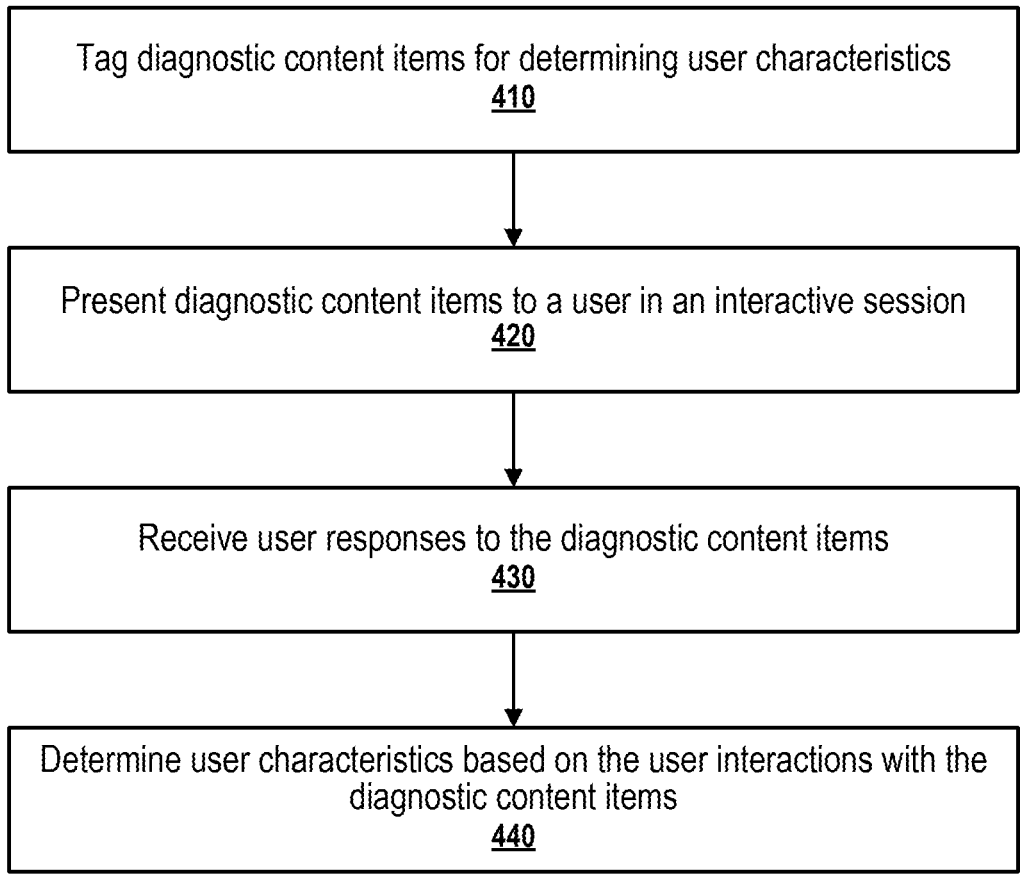
FIG. 4 illustrates an example of a method of user behavior classification according to certain embodiments.

FIG. 4 is a flow chart 400 illustrating an example of a method of user behavior classification according to certain embodiments. Operations in flow chart 400 can be performed by, for example, interactive computing platform 105 described above.

At block 410, diagnostic content items are tagged with a set of possible characteristics that can be determined at least partially based on the user response to each diagnostic content item. As described above, in some embodiments, the tag includes weights associated with corresponding characteristics of the set of possible characteristics. The diagnostic content items can be pre-determined and the corresponding weights can be pre-trained as described above. In one example, the diagnostic content items are selected from a set of diagnostic content items based on their effects on the final classification results. For example, a neural network with input nodes representing the set of diagnostic content items can be trained first, and then the neural network can be pruned to remove nodes associated with weights that are below a threshold value.

At block 420, content customization module 110 or other suitable module delivers the diagnostic content items to an end user device for presenting to the user during an interactive session. For example, the module can deliver the diagnostic content items to the user using a video stream or data stream over the Internet. Content customization module 110 can deliver the diagnostic content items to the user in a default setting that is same for all users. Content customization module 110 can deliver the diagnostic content items to the user in early stages of the interactive session or throughout the interactive session. For example, content customization module 110 can deliver the diagnostic content items to the user at certain time instants when the user needs a break from the educational materials.

At block 430, the interactive computing platform receives user interactions with the diagnostic content items. The associated diagnostic content item can also be received by the interactive computing platform. In some embodiments, the interactive computing platform also records user response time for each diagnostic content item. In some embodiments, the interactive computing platform also records some user actions, such as turning down the volume of an audio device (e.g., a speaker) or adjusting the window or font size.

At block 440, a user classification module (e.g., user classification module 130) of the interactive computing platform then determines relevant user characteristics based on the user responses as described above. In one embodiment, multi-layer neural network 300 or a CNN described above is used to classify the user, such as determining the user characteristics.

As the interactive session progresses, interactive content items (e.g., educational materials) are delivered to the end user device used by the user. The interactive computing platform continuously monitors the user progress, such as, for example, current stage of the session, progress rate for the session, and response speed and accuracy of the user's responses at different times, based on user interactions with the interactive content items. The user progress can be used to determine whether the interactive content needs to be adjusted in response to, for example, a lower progress rate or a lower accuracy. As described above, in some embodiments, from the monitored progress, certain statuses of the user can be determined. For example, the monitored user progress can be used to infer user engagement level, user fatigue, stalls, etc. A machine learning-based model or classifier as described above with respect to, for example, FIG. 3, can also be used to determine the user progress and/or user status based on various inputs, such as information associated with user interactions with the interactive content items.

In some embodiments, interactive content presented to the user at some early stages is the same for multiple user devices (or users associated with various devices). Such interactive content is referred to as control interactive content or control content. The control content is used to determine a baseline performance of the user. The baseline performance includes, for example, velocity/acceleration statistics (e.g., how quickly questions are answered by the user), accuracy, typing speed, a trend of question completion time indicating periods of inactivity, etc. In some embodiments, the baseline performance also includes other actions associated with velocity/accuracy statistics, such as increase/decrease of mouse movement, keyboard activity, etc. In some embodiments, the control content is presented to the user within a control period that is below a threshold duration. After the baseline performance is established, user performance at later stages of an interactive session can be compared with the baseline performance to determine whether the interactive content needs to be adjusted. In some embodiments, explicit controls, feedback, or signals (e.g., "this is too hard" or "I don't know") can be provided by the user in the response to indicate the user's progress or performance.

Figure 5:
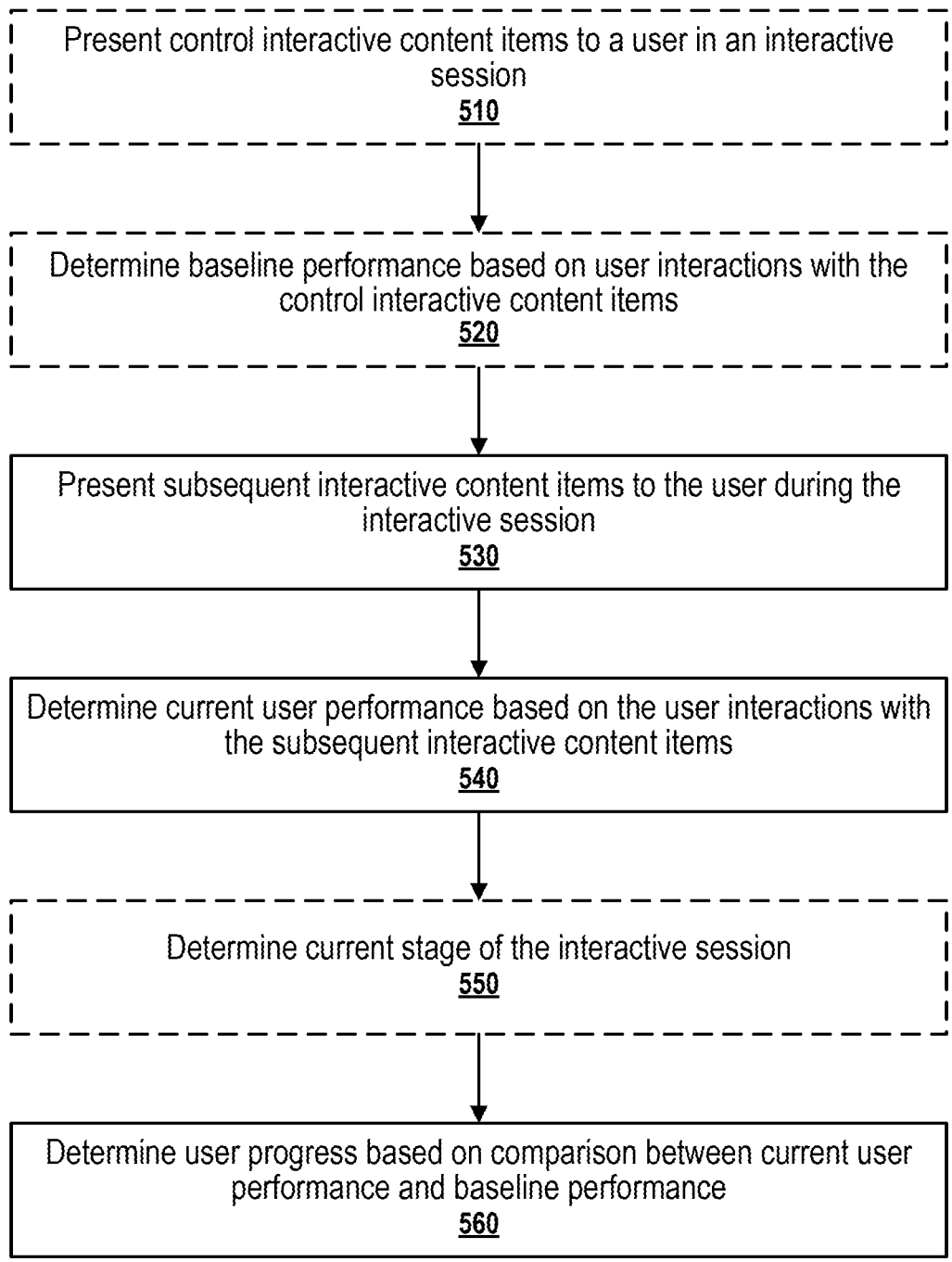
FIG. 5 illustrates an example of a method of monitoring user progress according to certain embodiments.

FIG. 5 is a flow chart 500 illustrating an example of a method of monitoring user progress according to certain embodiments. Operations in flow chart 500 can be performed by, for example, interactive computing platform 105 described above.

At block 510, optionally, content customization module 110 or other suitable module delivers control interactive content items to an end user device during an interactive session for presenting to the user. The control interactive content items are generally the same for all user. The control interactive content items include, for example, some lessons or quizzes. Content customization module 110 can deliver the control interactive content items to the user during a limited time period (e.g., a control period) in some early stages of the interactive session. The control interactive content items are used to determine a baseline performance of the user as described above.

At block 520, optionally, the interactive computing platform receives user interactions with the control interactive content items. In some embodiments, the interactive computing platform also records information associated with the user response, such as user response time for each control interactive content item. In some embodiments, the interactive computing platform also records some user actions, such as switching to other user application on the end user device or switching to a different web browser window. Information associated with user responses, the user responses, and other user actions during the control period are used to determine a baseline performance of the user as described above.

At block 530, content customization module 110 or other suitable module delivers subsequent interactive content items to the end user device during the interactive session for presenting to the user. The subsequent interactive content items are generally customized for each individual user. For example, the subsequent interactive content items can include customized lessons for the user.

At block 540, the interactive computing platform receives user interactions with the subsequent interactive content items. The interactive computing platform also records information associated with the user response, such as user response time for each subsequent interactive content item. In some embodiments, the interactive computing platform also records user actions during the time period when the subsequent interactive content items are presented, such as no interactive activity with the end user device, switching to other user application on the end user device, or switching to a different web browser window. Information associated with user responses, the user responses, and user actions during the time period are used to determine the current performance of the user based on, for example, a neural network as described above.

At block 550, content customization module 110 that delivers digital content to the end user device, or other suitable module can determine the current stage of the interactive session, for example, based on the content currently being delivered to the end user device.

At block 560, user progress monitoring module 140 or other suitable module determines user progress based on the comparison between the current user performance and the baseline performance of the user. For example, if user response time or error rate has increased compared with the baseline performance, it may indicate that the user progress rate has dropped and thus the content may need to be adjusted to improve the user progress rate or the user needs a break. In some embodiments, the user progress can also be determined based on the current stage. For example, at some stages, the content may be difficult for most users, and thus a lower progress rate or a lower accuracy does not necessarily indicate that the user is tired or lacks attention. In some embodiments, the user progress includes the current stage that the user is at.

Based on the determined user characteristics and/or user progress, customized content as described above is determined for the user. In general, the content can be customized in real-time in response to the user progress. As such, appropriate stimulus or break can be offered to the user, and the appropriate content can be provided to the user at the right time to improve user progress or comprehension of the presented materials. For example, different types of content (e.g., videos vs paragraphs of text, abstract concepts vs concrete examples, open-ended questions vs multiple choice questions, content that matches user's interests better, etc.) can be presented to the user. In some specific examples, videos of user's favorite sports (e.g., basketball or football) can be presented to the user; a song that matches the user's tastes (e.g., classical music) can be played in the background; additional materials (e.g., concrete examples) that can help a user to better comprehend an concept that is hard or too abstract to understand.

In some embodiments, the content adjustment is triggered by a drop in user progress rate from the baseline performance of the user described above. For example, if a certain threshold in progress rate decrease is reached (i.e., the accuracy is 20% lower), the content may be re-customized. In some embodiments, the content adjustment is also triggered based on statistical data associated with the performance of other users at a similar or same stage. For example, if the user progress rate (e.g., speed or accuracy) is below the average progress rate of other users, the content re-customization may be triggered. In some embodiments, the time when the interactive session occurs is also taken into consideration when determining whether the content needs to be adjusted. For example, if the session occurs right after lunch or at midnight, it may be expected that the user progress rate can drop by a certain percent. In some embodiments, the new customized content items are selected based on the content items that have worked best for other users having similar user characteristics and similar progress rate at the current stage.

Figure 6:
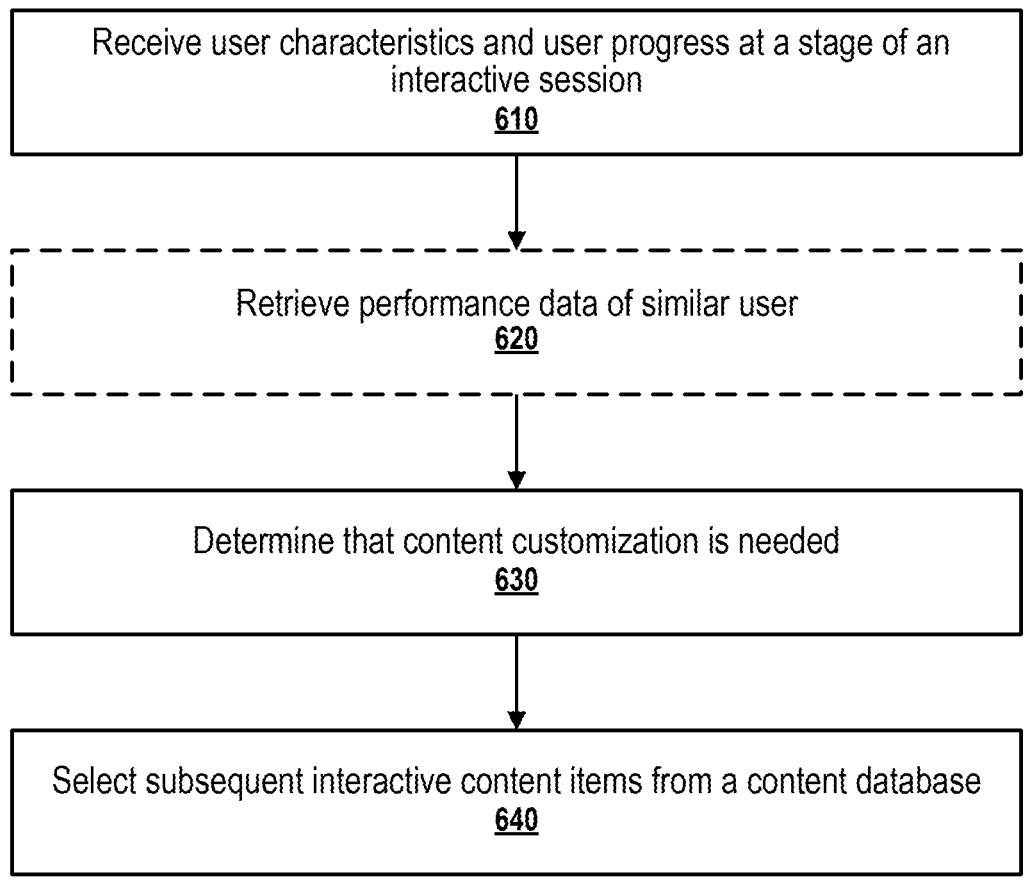
FIG. 6 illustrates an example of a method of content customization according to certain embodiments.

FIG. 6 is a flow chart 600 illustrating an example of a method of content customization according to certain embodiments. Operations in flow chart 600 can be performed by, for example, interactive computing platform 105, and more specifically, analytics and targeting server 150, described above.

At block 610, a content customization module, an analytics and targeting server, or other suitable module as described above receives user characteristics and user progress data at a stage of an interactive session. In some embodiments, the user progress data includes the baseline performance of the user. Optionally, at block 620, the analytics and targeting server retrieves performance data of other users having similar user characteristics and progress rate at the stage from a database. The performance data includes statistical data of the similar users, such as average progress rate (e.g., average speed or accuracy) or the distribution of progress rates of the similar users. At block 630, the content customization module can trigger content customization based on the user progress and the baseline progress of the user and/or the performance data of similar users.

At block 640, the analytics and targeting server selects subsequent interactive content items to be present to the end user device from a content database, such as digital content repository 120, or creates subsequent interactive content items based on interactive content items in the content database. In various embodiment, a neural network as described above can be used to select the appropriate interactive content items from the content database. In one example, parameters that would affect the selection are represented by nodes on an input layer of the neural network. The parameters include, for example, various user characteristics, current stage, user progress data, interactive content items presented to similar users and the associated effectiveness, etc. The available interactive content items to be selected from for the current stage are represented by nodes on the output layer of the neural network. The neural network includes weights associated with the connections between the nodes of the network, where the weights are pre-determined or fine-tuned by a training process based on, for example, the effectiveness of the customized interactive content items selected for other users at a similar stage. For each available interactive content item, a probability value that the interactive content item may be effective for improving user performance at the current stage is determined using the neural network. Interactive content items that are mostly likely to improve the user performance are selected for presenting to the end user device.

The effectiveness of the customized content items is measured based on, for example, user progress (e.g., user performance monitored by user progress monitoring module 140 as described above) after the customized content items are presented to the user. If the user performance is improved after the customized interactive content items are presented to the user, the customized interactive content items are effective. For example, it may be determined that inserting a joke when a user progresses at a slower rate reduces the response time for the next question by over 10%, or providing additional examples to explain a concept improves the accuracy of the user's answers to subsequent questions by 35%. Otherwise, it can be determined that, for example, the customized interactive content items are not effective and different customized interactive content items may be needed, or the model or neural network used for the content customization may need to be improved. In this way, more effective customized content can be presented to the user or other users.

In certain embodiments, the effectiveness of each customized content item, the effectiveness of a group of customized content items, and/or the effectiveness associated with other changes made to the interactive content (e.g., the manner of presenting the content) is scored and logged. The score is determined by a combination of different factors, such as velocity and accuracy. These logs are fed back to the interactive computing platform for use in selecting new interactive content items or retraining the neural network used for content item selection. In certain embodiments, the effectiveness of the customized content is also used to more accurately determine a user's learning style.

Figure 7:
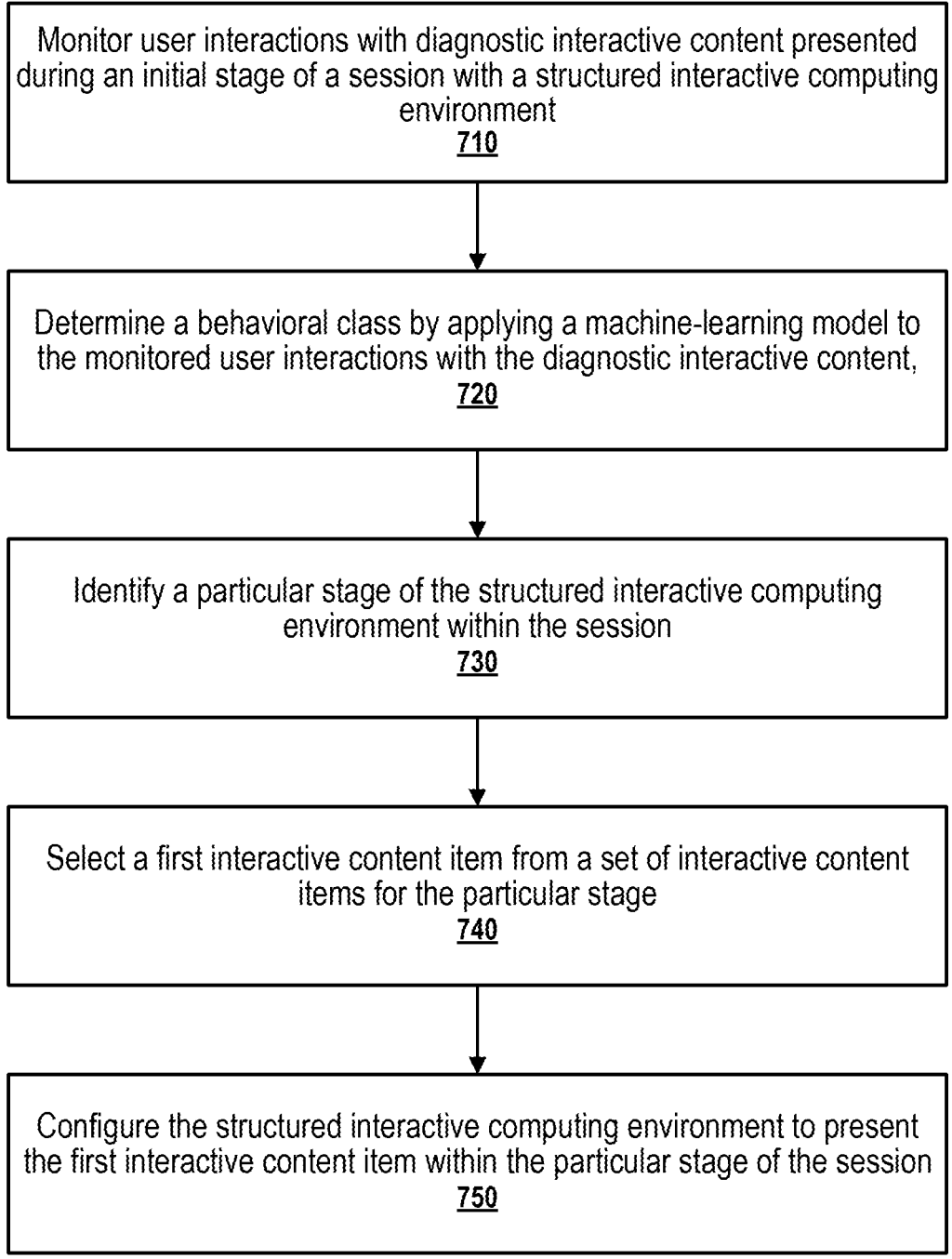
FIG. 7 is illustrates an example of a method of dynamically customizing structured interactive computing environments.

FIG. 7 is a flow chart 700 illustrating an example of a method of dynamically customizing structured interactive computing environments. Operations in flow chart 700 can be performed by, for example, various modules or components of interactive computing platform 105.

At block 710, user classification module 130 or other suitable module monitors user interactions with diagnostic interactive content presented during an initial stage of a session with a structured interactive computing environment. More detail of presenting diagnostic interactive content and monitoring user interactions with the diagnostic interactive content is described above with respect to, for example, FIGS. 1, 2, and 4.

At block 720, user classification module 130 or other suitable module determines a behavioral class of the user by applying a machine-learning model to the monitored user interactions with the diagnostic interactive content, where the behavioral class indicates certain learning characteristics of the user. More detail of user behavior classification (e.g., user characteristic determination) is described above with respect to, for example, FIGS. 1-4.

At block 730, content customization module 110, user progress monitoring module 140, or other suitable module determines a particular stage of the session within the structured interactive computing environment. The particular stage is associated with a set of interactive content items having different features for advancing to a subsequent stage of the session.

At block 740, analytics and targeting server 150 or other suitable module selects a first interactive content item corresponding to the determined behavioral class, rather than a second interactive content item corresponding to a different behavioral class, from the set of interactive content items associated with the particular stage. The selection can be performed by analytics and targeting server 150 based on, for example, a neural network. More detail of the interactive content item selection is described above with respect to, for example, FIGS. 1-4.

At block 750, content customization module 110 or other suitable module configures the structured interactive computing environment to present the first interactive content item within the particular stage of the session. More detail of configuring the structured interactive computing environment to present customized content is described above with respect to, for example, FIGS. 1, 5, and 6.

FIGS. 2 and 4-7 illustrate examples of flows for content customization in a structured interactive computing environment. A computing system, such as one including computing system 800 of FIG. 8, can be configured to perform the illustrative flows in some embodiments. Instructions for performing the operations of the illustrative flows can be stored as computer-readable instructions on a non-transitory computer-readable medium of the computer system. As stored, the instructions represent programmable modules that include code or data executable by a processor(s) of the computer system. The execution of such instructions configures the computer system to perform the specific operations shown in the figures and described herein. Each programmable module in combination with the processor represents a means for performing a respective operation(s). While the operations are illustrated in a particular order, it should be understood that no particular order is necessary and that one or more operations may be omitted, skipped, and/or reordered.

Figure 8:
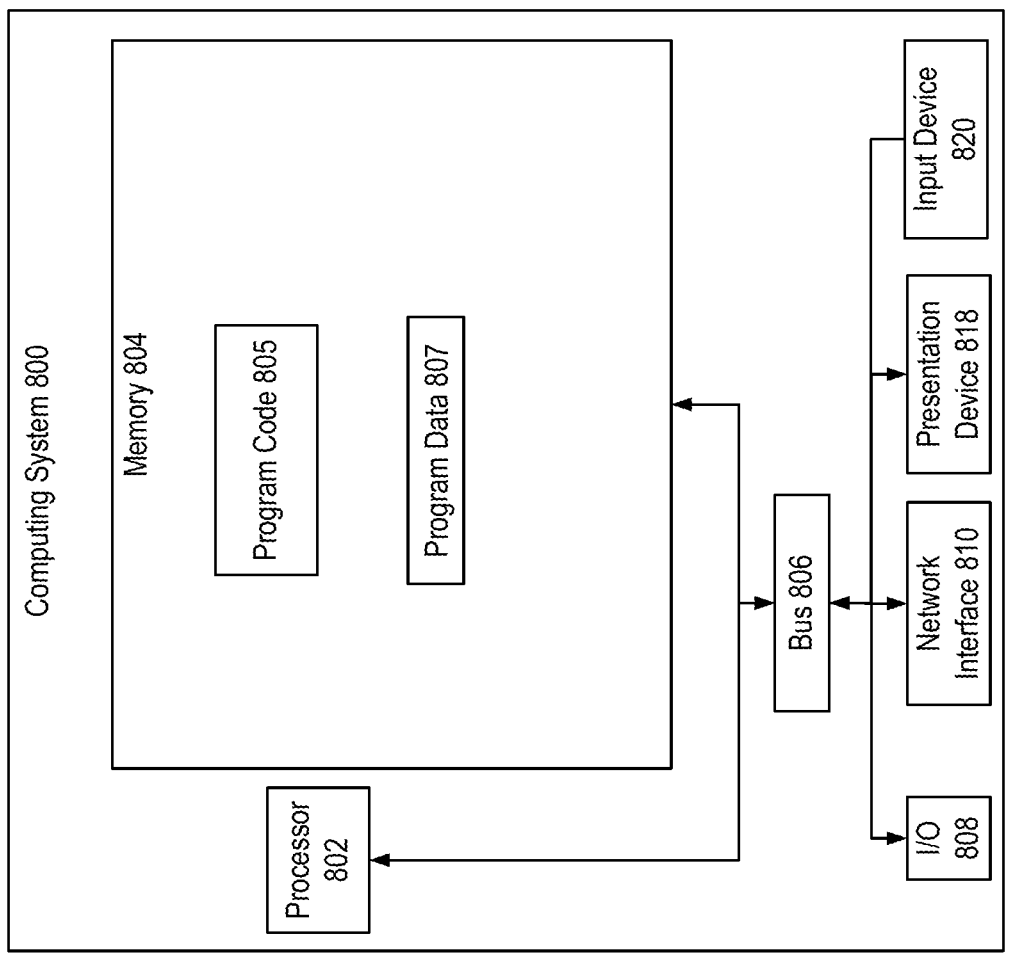
FIG. 8 illustrates an example of a computer system for implementing some of the embodiments disclosed herein.

Any suitable computing system or group of computing systems can be used for performing the operations described herein. For example, FIG. 8 depicts an example of the computing system 800. The implementation of computing system 800 could be used for one or more of interactive computing platform 105, content customization module 110, user classification module 130, user progress monitoring module 140, analytics and targeting server 150, and end user devices 170. In other embodiments, a single computing system 800 having devices similar to those depicted in FIG. 8 (e.g., a processor, a memory, etc.) combines the one or more operations and data stores depicted in FIG. 1.

The depicted example of a computing system 800 includes a processor 802 communicatively coupled to one or more memory devices 804. The processor 802 executes computer-executable program code stored in a memory device 804, accesses information stored in the memory device 804, or both. Examples of the processor 802 include a microprocessor, an application-specific integrated circuit ("ASIC"), a field-programmable gate array ("FPGA"), or any other suitable processing device. The processor 802 can include any number of processing devices, including a single processing device.

A memory device 804 includes any suitable non-transitory computer-readable medium for storing program code 815, program data 816, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C #, Visual Basic, Java, Python, Perl, JavaScript, and ActionScript.

The computing system 800 may also include a number of external or internal devices, an input device 820, a presentation device 818, or other input or output devices. For example, computing system 800 is shown with one or more input/output ("I/O") interfaces 808. An I/O interface 808 can receive input from input devices or provide output to output devices. One or more buses 806 are also included in the computing system 800. The bus 806 communicatively couples one or more components of a respective one of the computing system 800.

The computing system 800 executes program code 805 that configures the processor 802 to perform one or more of the operations described herein. Examples of the program code 805 include, in various embodiments, modeling algorithms executed by the environment evaluation system 102 (e.g., functions of the experience metric computation model 104), the training engine 122, the online platform 114, or other suitable applications that perform one or more operations described herein (e.g., one or more development applications for configuring the online platform 114). The program code may be resident in the memory device 804 or any suitable computer-readable medium and may be executed by the processor 802 or any other suitable processor.

In some embodiments, one or more memory devices 804 stores program data 807 that includes one or more datasets and models described herein. Examples of these datasets include interaction data, experience metrics, training interaction data or historical interaction data, transition importance data, etc. In some embodiments, one or more of data sets, models, and functions are stored in the same memory device (e.g., one of the memory devices 804). In additional or alternative embodiments, one or more of the programs, data sets, models, and functions described herein are stored in different memory devices 804 accessible via a data network.

In some embodiments, the computing system 800 also includes a network interface device 810. The network interface device 810 includes any device or group of devices suitable for establishing a wired or wireless data connection to one or more data networks. Non-limiting examples of the network interface device 810 include an Ethernet network adapter, a modem, and/or the like. The computing system 800 is able to communicate with one or more other computing devices (e.g., a computing device executing an environment evaluation system 102) via a data network using the network interface device 810.

In some embodiments, the computing system 800 also includes the input device 820 and the presentation device 818 depicted in FIG. 8. An input device 820 can include any device or group of devices suitable for receiving visual, auditory, or other suitable input that controls or affects the operations of the processor 802. Non-limiting examples of the input device 820 include a touchscreen, a mouse, a keyboard, a microphone, a separate mobile computing device, etc. A presentation device 818 can include any device or group of devices suitable for providing visual, auditory, or other suitable sensory output. Non-limiting examples of the presentation device 818 include a touchscreen, a monitor, a speaker, a separate mobile computing device, etc.

Although FIG. 8 depicts the input device 820 and the presentation device 818 as being local to the computing device that executes the environment evaluation system 102, other implementations are possible. For instance, in some embodiments, one or more of the input device 820 and the presentation device 818 can include a remote client-computing device that communicates with the computing system 800 via the network interface device 810 using one or more data networks described herein.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some embodiments. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

The invention claimed is:

1. A computer-implemented method of dynamically customizing structured interactive computing environments, wherein the computer-implemented method comprises performing, by one or more processing devices, operations including:
    monitoring user interactions with interactive content items presented during multiple stages of a session with a structured interactive computing environment;
    during an initial stage of the session, determining a user behavioral class by applying a machine-learning model to the monitored user interactions with a diagnostic item of the interactive content items, wherein the user behavioral class indicates learning characteristics that provide enhanced comprehension of the interactive content items for a particular user, wherein the learning characteristics comprise:
        a set of permanent characteristics that indicate a learning style of the particular user and are static during the session and a subsequent session; and
        a set of temporary characteristics that indicate dynamic characteristics of the particular user within the session; and
    customizing, during an additional stage of the session, subsequent interactive content items presented within the structured interactive computing environment, wherein customizing the subsequent interactive content items comprises:
        identifying a particular stage of the session with the structured interactive computing environment, wherein the particular stage is associated with a set of the interactive content items having different features for advancing to a subsequent stage of the session;
    determining, based on the learning characteristics of the determined user behavioral class, a first effectiveness probability associated with a first interactive content item from the set of the interactive content items, the first interactive content item corresponding to the determined user behavioral class;
    determining a second effectiveness probability associated with a second interactive content item from the set of the interactive content items, the second interactive content item corresponding to additional learning characteristics of an additional user behavioral class,
    wherein the first effectiveness probability indicates a likelihood of improved comprehension of the first interactive content item for the particular user and the second effectiveness probability indicates a likelihood of improved comprehension of the second interactive content item for the particular user;
    selecting, based on determined values of the first effectiveness probability and the second effectiveness probability, the first interactive content item rather than the second interactive content item; and
    configuring the structured interactive computing environment to present the first interactive content item within the particular stage of the session.

2. The computer-implemented method of claim 1, wherein customizing the subsequent interactive content items further comprises:
 monitoring, after the first interactive content item is presented, subsequent user interactions with the structured interactive computing environment;
 determining, from the subsequent user interactions, an effectiveness of the first interactive content item; and
 determining a next interactive content item to be presented to the particular user based at least in part on the effectiveness of the first interactive content item.

3. The computer-implemented method of claim 1, wherein the machine-learning model comprises a first neural network, the first neural network including:
 a plurality of input nodes, each input node representing a respective diagnostic interactive content item; and
 a plurality of output nodes, each output node representing a respective user behavioral class,
 wherein determining the first effectiveness probability further comprises:
 receiving, by a second neural network and from a particular output node of the first neural network, the learning characteristics of the determined user behavioral class as an input to the second neural network; and
 computing the first effectiveness probability by applying the second neural network to the learning characteristics received from the first neural network.

4. The computer-implemented method of claim 3, wherein each diagnostic interactive content item corresponds to a set of user behavior classes and has a predetermined weight associated with each respective user behavioral class of the set of user behavioral classes.

5. The computer-implemented method of claim 1, wherein the operations further include:
 monitoring user interactions with customized interactive content presented during the session;
 determining a user progress value based on the monitored user interactions with the customized interactive content, wherein the user progress value indicates a performance of the particular user during the monitored user interactions with the customized interactive content;
 determining that the user progress value is below a threshold value; and
 triggering the customizing of the subsequent interactive content items.

6. The computer-implemented method of claim 5, wherein the operations further include:
 monitoring user interactions with control interactive content presented during an early stage of the session; and
 determining a baseline user progress value based on the monitored user interactions with the control interactive content, wherein the threshold value is associated with the baseline user progress value.

7. The computer-implemented method of claim 5, wherein:
 the operations further include retrieving user progress values for users in the determined user behavioral class; and
 the threshold value is determined based on the retrieved user progress values.

8. The computer-implemented method of claim 1, wherein the structured interactive computing environment includes an e-learning platform.

9. The computer-implemented method of claim 1, wherein selecting the first interactive content item comprises:
 receiving, as inputs to a neural network, the learning characteristics of the determined user behavioral class, wherein the neural network includes multiple output nodes, each of the multiple output nodes corresponding to a respective interactive content item from the set of the interactive content items; and
 receiving, via a first output node of the multiple output nodes, the first effectiveness probability as an output generated by the neural network, wherein the first output node corresponds to the first interactive content item,
 wherein selecting the first interactive content item is further responsive to receiving the first effectiveness probability via the first output node.

10. The computer-implemented method of claim 1, wherein configuring the structured interactive computing environment to present the first interactive content item comprises:
 determining a first manner corresponding to the determined user behavioral class to present the first interactive content item rather than a second manner corresponding to the additional user behavioral class; and
 configuring the structured interactive computing environment to present the first interactive content item in the first manner.

11. The computer-implemented method of claim 1, wherein the determining the user behavioral class comprises:
 determining the set of permanent characteristics by applying the machine-learning model to determine the set of permanent characteristics based on learned behavioral classes of the particular user based on binary classification or multi-class classification; and
 determining the set of temporary characteristics by computing a user characteristic by recoding a plurality of responses to a group of interactive content items, wherein each interactive content item in the group of interactive content items includes a tag and a weight associated with a particular characteristic of the particular user.

12. A system comprising:
 a processing device; and
 a non-transitory computer-readable medium communicatively coupled to the processing device, wherein the processing device is configured to execute program code stored in the non-transitory computer-readable medium and thereby perform operations comprising:
 monitoring user interactions with interactive content items presented during a session with a structured interactive computing environment;
 during an initial stage of the session, determining a user behavioral class by applying a machine-learning model to the monitored user interactions with a diagnostic item of the interactive content items, wherein the user behavioral class indicates learning characteristics that provide enhanced comprehension of the interactive content items for a particular user, wherein the learning characteristics comprise:
 a set of permanent characteristics that indicate a learning style of the particular user and are static during the session and a subsequent session; and
 a set of temporary characteristics that indicate dynamic characteristics of the particular user within the session; and
 customizing, during an additional stage of the session, subsequent interactive content items presented within the structured interactive computing environment, wherein customizing the subsequent interactive content items comprises:
receiving, as inputs to a neural network, the learning characteristics of the determined user behavioral class;
identifying a particular stage of the session with the structured interactive computing environment, wherein the particular stage is associated with a set of the interactive content items having different features for advancing to a subsequent stage of the session;
determining, via the neural network and based on the learning characteristics received as inputs, a first effectiveness probability associated with a first interactive content item from the set of the interactive content items, the first interactive content item corresponding to the determined user behavioral class;
determining a second effectiveness probability associated with a second interactive content item from the set of the interactive content items, the second interactive content item corresponding to additional learning characteristics of an additional user behavioral class,
wherein the first effectiveness probability indicates a likelihood of improved comprehension of the first interactive content item for the particular user and the second effectiveness probability indicates a likelihood of improved comprehension of the second interactive content item for the particular user;
selecting, based on determined values of the first effectiveness probability and the second effectiveness probability, the first interactive content item rather than the second interactive content item; and
configuring the structured interactive computing environment to present the first interactive content item within the particular stage of the session.

13. The system of claim 12, wherein the operations further comprise:
monitoring, after the first interactive content item is presented, subsequent user interactions with the structured interactive computing environment;
determining, from the subsequent user interactions, an effectiveness of the first interactive content item; and
determining a next interactive content item to be presented to the particular user based at least in part on the effectiveness of the first interactive content item.

14. The system of claim 12, wherein each diagnostic interactive content item corresponds to a set of user behavioral classes and has a pre-determined weight associated with each respective user behavioral class of the set of user behavioral classes.

15. The system of claim 12, wherein the operations further include:
monitoring user interactions with customized interactive content presented during the session:
determining a user progress value based on the monitored user interactions with the customized interactive content, wherein the user progress value indicates a performance of the particular user during the monitored user interactions with the customized interactive content;
determining that the user progress value is below a threshold value; and
triggering the customizing of the subsequent interactive content items.

16. The system of claim 15, wherein the operations further include:
monitoring user interactions with control interactive content presented during an early stage of the session; and
determining a baseline user progress value based on the monitored user interactions with the control interactive content, wherein the threshold value is associated with the baseline user progress value.

17. The system of claim 12, wherein:
selecting the first interactive content item further comprises determining a manner corresponding to the determined user behavioral class to present the first interactive content item, and
configuring the structured interactive computing environment to present the first interactive content item comprises configuring the structured interactive computing environment to present the first interactive content item in the determined manner.

18. A structured interactive content system comprising:
means for monitoring user interactions with interactive content items presented during a session with a structured interactive computing environment;
means for, during an initial stage of the session, determining a user behavioral class by applying a machine-learning model to the monitored user interactions with a diagnostic item of the interactive content items, wherein the user behavioral class indicates learning characteristics that provide enhanced comprehension of the interactive content items for a particular user, wherein the learning characteristics comprise:
a set of permanent characteristics that indicate a learning style of the particular user and are static during the session and a subsequent session; and
a set of temporary characteristics that indicate dynamic characteristics of the particular user within the session; and
means for customizing, during an additional stage of the session, subsequent interactive content items presented within the structured interactive computing environment, wherein customizing the subsequent interactive content items comprises:
means for identifying a particular stage of the session with the structured interactive computing environment, wherein the particular stage is associated with a set of the interactive content items having different features for advancing to a subsequent stage of the session;
means for determining, based on the learning characteristics of the determined user behavioral class, a first effectiveness probability associated with a first interactive content item from the set of the interactive content items, the interactive content item corresponding to the determined user behavioral class;
means for determining a second effectiveness probability associated with a second interactive content item from the set of the interactive content items, the second interactive content item corresponding to additional learning characteristics of an additional user behavioral class,
wherein the first effectiveness probability indicates a likelihood of improved comprehension of the first interactive content item for the particular user and the second effectiveness probability indicates a likelihood of improved comprehension of the second interactive content item for the particular user;
means for selecting, based on determined values of the first effectiveness probability and the second effectiveness probability, the first interactive content item rather than the second interactive content item; and means for configuring the structured interactive computing environment to present the first interactive content item within the particular stage of the session.

19. The structured interactive content system of claim 18, wherein each diagnostic interactive content item corresponds to a set of user behavioral classes and has a predetermined weight associated with each respective user behavioral class of the set of user behavioral classes.

20. The structured interactive content system of claim 18, further comprising:

means for monitoring user interactions with customized interactive content presented during the session;

means for determining a user progress value based on the monitored user interactions with the customized interactive content, wherein the user progress value indicates a performance of the particular user during the monitored user interactions with the customized interactive content;

means for determining that the user progress value is below a threshold value; and means for triggering the customizing of the subsequent interactive content items.

\* \* \* \* \*